Figure 1:
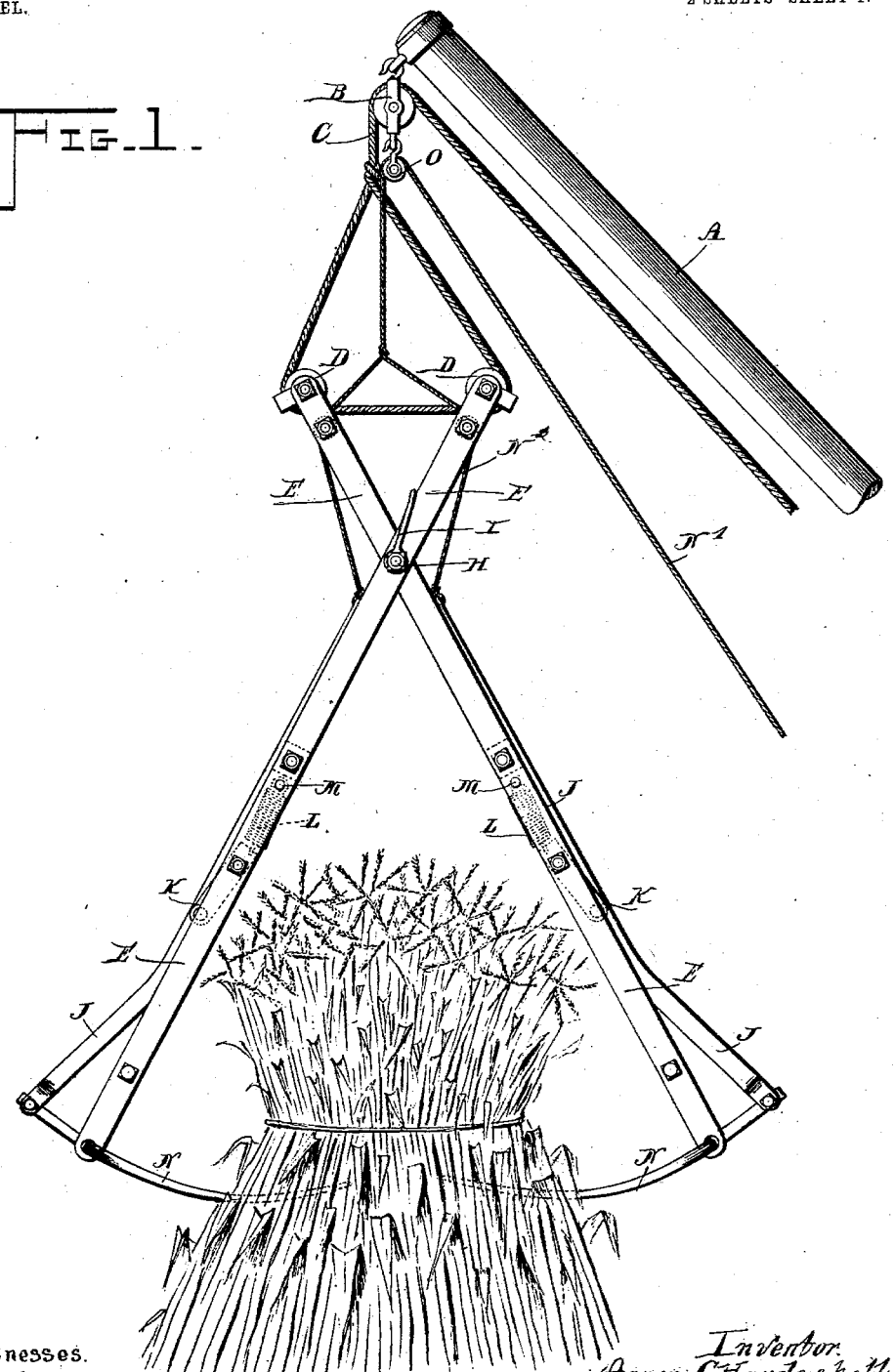

No. 743,875. PATENTED NOV. 10, 1903.
A. C. HOUDYSHELL.
GRAPPLING FORK.
APPLICATION FILED NOV. 10, 1902.
NO MODEL. 2 SHEETS—SHEET 1.

Witnesses.
J. F. Groat.
L. A. St. John.

Inventor.
Aaron C. Houdyshell
By J. M. St. John
Atty.

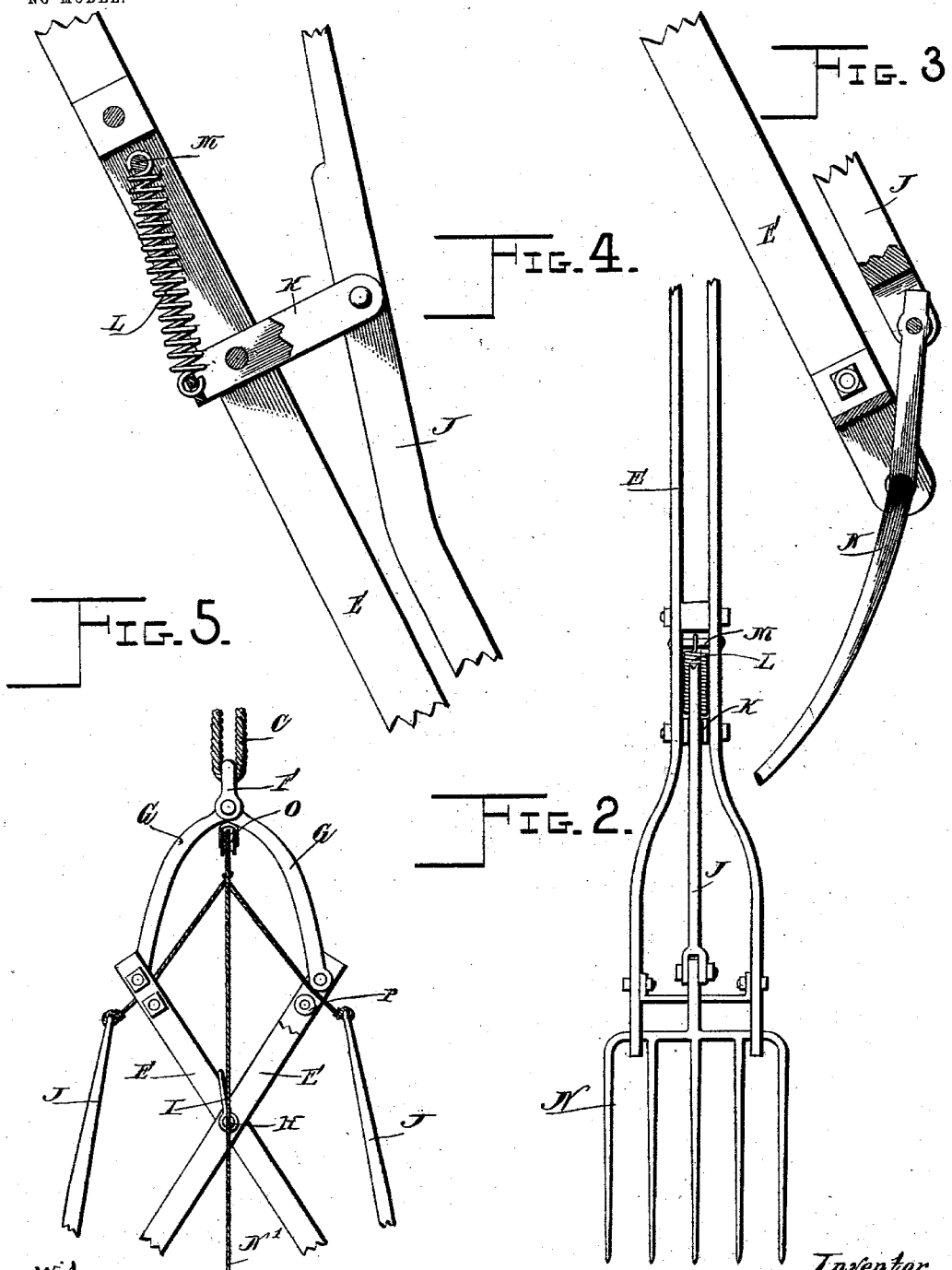

No. 743,875. Patented November 10, 1903.

UNITED STATES PATENT OFFICE.

AARON CALVIN HOUDYSHELL, OF TAMA, IOWA.

GRAPPLING-FORK.

SPECIFICATION forming part of Letters Patent No. 743,875, dated November 10, 1903.

Application filed November 10, 1902. Serial No. 130,822. (No model.)

*To all whom it may concern:*

Be it known that I, AARON CALVIN HOUDYSHELL, a citizen of the United States, residing at Tama, in the county of Tama and State of Iowa, have invented certain new and useful Improvements in Grappling-Forks, of which the following is a specification.

This invention relates to apparatus for loading corn-shocks and the like, and has for its object to provide an efficient grappling-fork capable of supporting a corn-shock and of being quickly released therefrom when loaded.

The nature of the invention will fully appear from the description and claims following, reference being had to the accompanying drawings, forming part of this specification, in which—

Figure 1 is a side view of a fork embodying my invention as in use. Fig. 2 is a view of one of the forks as seen from the back side. Figs. 3 and 4 are sectional views showing details of the fork and its mode of construction. Fig. 5 shows a modification in the construction of the upper portion of the device, especially the connection with the supporting-derrick.

In the drawings, A denotes the boom of a derrick, (not shown,) which is supposed to be mounted on a wagon adapted to transport a number of corn-shocks. To the end of this boom is attached a sheave-block B, carrying a lifting-rope C, which connects with the upper ends of the grappling-forks, hereinafter to be described. As shown in Fig. 1, the connection is simply a loop in the rope, embracing sheaves D, mounted at the upper ends of the fork-levers E. The rope might, however, connect by a suitable stirrup or clevis F with a pair of links G, hinged to said fork-levers, as shown in Fig. 5, though in practice the form shown in Fig. 1 is preferred. The levers E are bifurcated, as shown in Fig. 2, and are hinged together at H by a suitable pin or bolt passing through a clevis I, the loop of which lies between the levers and prevents their shutting tightly together in lifting a shock. Central to each lever is mounted a trip-lever J by a link K, pivoted to the fork-lever. This link is preferably in the form of a stirrup, as indicated in Fig. 4, and the trip-lever is pivoted between its arms at one end. To the opposite end is attached a spring L, the upper end of which connects suitably with the fork-lever, as by a rivet M, to which the spring is hooked. The lower ends of the fork-levers connect pivotally with the transverse portion of a fork N, (preferably five-tined.) To the shank of the fork, which is flattened and perforated for the purpose, is pivoted the trip-lever. Each trip-lever connects at the upper end by a short section of cord $N^2$ with a trip-cord $N'$, running over a sheave O. To give freedom of movement to the trip-cord, sheaves or rollers P are provided near the upper ends of the fork-levers, as shown in Fig. 5.

When in grappling position, the parts take the positions shown in Fig. 1. The shank of the fork now stands practically at right angles to the fork-lever. The trip-lever lies mainly parallel with the fork-lever, but near the lower end is bent outwardly to take the shank of the fork. It will be observed that the three pivots which determine the movement of the trip-lever are now practically in line, and both the trip-lever and the fork are firmly locked until released by a pull on the trip-rope, which throws these joints out of line, and the weight of the depending shock draws the fork down and throws the trip-lever up, as shown in Figs. 3 and 4. As soon as the shock has stripped off from the forks the springs L restore the parts to the original position.

In operating the grappling-fork the operator takes the fork in hand and throws it over the top of the shock. The lift of the derrick-rope forces the forks of the grapple farther into the shock, and finally elevates it to loading position.

Having thus described my invention, what I claim as new, and desire to secure by Letters Patent, is—

1. A grappling-fork, comprising a pair of levers, a fork pivotally connected with one end of each, a trip-lever hinged to each fork-shank, a link connecting said trip-lever pivotally with each fork-lever, a spring adapted to draw the parts into operative position, with the trip-lever joints in alinement, and means substantially as described for lifting and closing the grapple, and for releasing the same.

2. In a grappling-fork, the combination of a fork with a projecting shank, a bifurcated lever to which the fork is pivoted by its transverse portion, a trip-lever hinged at one end to the fork-shank, a link connecting the trip-lever pivotally with the fork-lever, and a spring adapted to lock the parts in operative position by drawing the trip-lever joints into alinement, substantially as described.

3. In a grappling-fork, the combination of a pair of fork-levers hinged together between their ends, a fork hinged to one end of each lever, a trip-lever adapted to lock each fork in operative position, a trip-cord to release the same, means for lifting and closing the grapple connecting with the upper ends of the fork-levers, and a stop to limit the closing of the grapple, as described.

4. In a grappling-fork, the combination of a pair of crossed levers hinged together, a fork hinged to one end of each, a trip-lever hinged to the shank of each fork, and a link connecting each with the fork-lever, whereby the joints of the trip-lever are in alinement when in operative position, a trip-cord adapted to release the trip-levers, a sheave at the upper end of each fork-lever, and a lift-rope looped to embrace both sheaves, substantially as and for the purpose set forth.

In testimony whereof I affix my signature in presence of two witnesses.

AARON CALVIN HOUDYSHELL.

Witnesses:
ART E. EVERETT,
JOHN B. MURDOUGH.